United States Patent
Dengler

(12) 
(10) Patent No.: US 6,581,103 B1
(45) Date of Patent: Jun. 17, 2003

(54) METHOD FOR INTERNET RADIO BROADCASTING INCLUDING LISTENER REQUESTS OF AUDIO AND/OR VIDEO FILES WITH INPUT DEDICATIONS

(75) Inventor: Christopher Anthony Dengler, Monroe, WA (US)

(73) Assignee: Dedicated Radio, LLC

( * ) Notice: Subject to any disclaimer, the term of this patent is extended or adjusted under 35 U.S.C. 154(b) by 0 days.

(21) Appl. No.: 09/422,159

(22) Filed: Oct. 22, 1999

(51) Int. Cl.[7] ............................................. G06F 15/16

(52) U.S. Cl. .................... 709/231; 709/203; 709/219; 709/232; 707/1

(58) Field of Search ................................ 709/203, 219, 709/231, 232; 707/1

(56) References Cited

U.S. PATENT DOCUMENTS

| | | | | |
|---|---|---|---|---|
| 5,890,910 A | * | 4/1999 | Tsurumi et al. | 434/307 A |
| 5,893,091 A | * | 4/1999 | Hunt et al. | 707/3 |
| 5,918,223 A | * | 6/1999 | Blum et al. | 707/1 |
| 5,947,746 A | * | 9/1999 | Tsai | 434/307 A |
| 5,953,005 A | * | 9/1999 | Liu | 345/302 |
| 6,006,218 A | * | 12/1999 | Breese et al. | 707/3 |
| 6,069,310 A | * | 5/2000 | James | 84/645 |
| 6,085,253 A | * | 7/2000 | Blackwell et al. | 709/235 |
| 6,175,822 B1 | * | 1/2001 | Jones | 704/270 |
| 6,311,161 B1 | * | 10/2001 | Anderson et al. | 704/500 |
| 6,374,225 B1 | * | 4/2002 | Hejna, Jr. | 704/270 |
| 6,389,463 B2 | * | 5/2002 | Bolas et al. | 709/219 |
| 2001/0042109 A1 | * | 11/2001 | Bolas et al. | 709/219 |

* cited by examiner

Primary Examiner—Nabil El-Hady

(57) ABSTRACT

A method of Internet radio broadcasting, which provides for including listener dedications to accompany the broadcast of a requested final selection audio and/or video file.

2 Claims, 2 Drawing Sheets

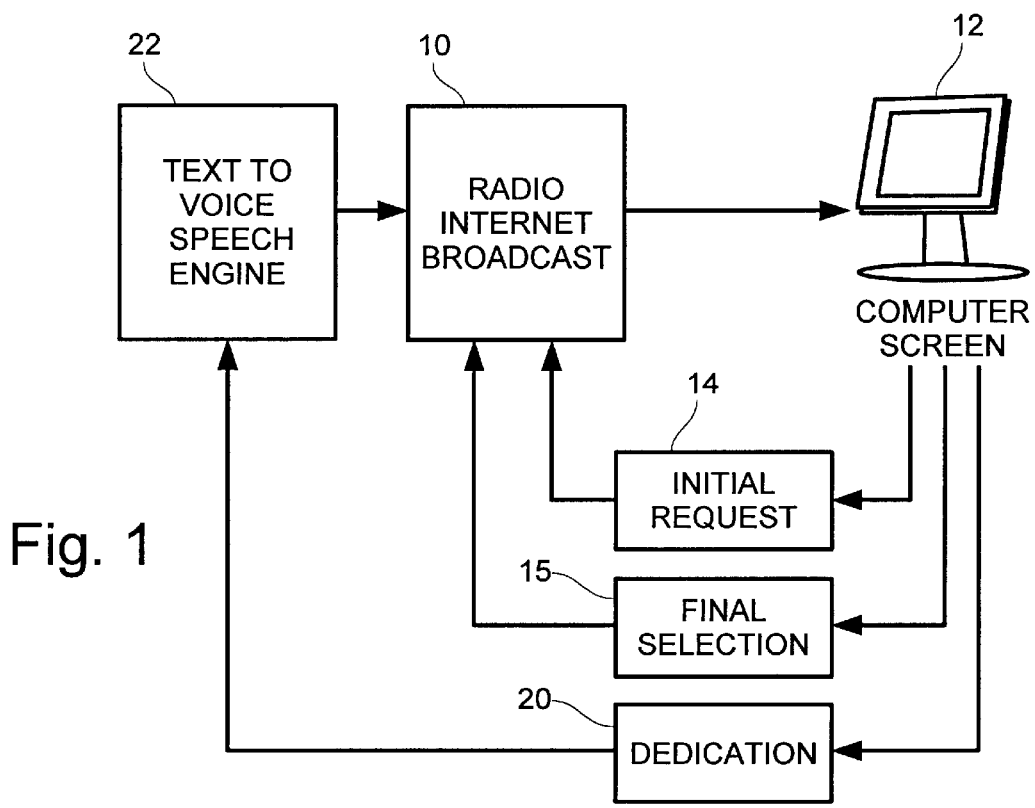

METHOD FOR INTERNET RADIO BROADCASTING INCLUDING LISTENER REQUESTS OF AUDIO AND/OR VIDEO FILES WITH INPUT DEDICATIONS

BACKGROUND OF THE INVENTION

Our patent suggestion is for Internet Radio Broadcasting to allow users to make requests from their Internet Browsers or other client applications accessing the Internet and hear them over the Internet. Currently there aren't any Internet applications that allow for users to make real time requests for music or select audio songs, have them played back in an orderly fashion while allowing for the optional use of typed dedications to be spoken back over the audio stream.

FIELD OF THE INVENTION

The field of this invention relates to broadcasting and more particularly to broadcasting of radio over the Internet to be received by listeners oil computers and other Internet aware devices.

DESCRIPTIONS OF THE RELATED ART

The broadcasting of radio by means of the Internet is a fairly recent development. When a listener logs onto a particular web site, audio files, usually songs, are played. The selections of which audio files are to be played are controlled by the owner or operator of the web site.

In the past, in conjunction with conventional radio a desirable procedure was to get the listeners involved in conjunction with the broadcasting station. Generally, this type of procedure increased the number of listeners, and of course the greater number of listeners the more successful a radio station. One way to get the listeners involved is to have the radio station accept requests for particular songs or to hear certain audio files, such as a comedy routine. Generally, within conventional radio stations, requests are taken by telephone. It would be desirable to somehow incorporate in conjunction with an Internet radio station a technique for the Internet radio station to accept requests and dedications from listeners.

BRIEF SUMMARY OF THE INVENTION

The primary embodiment of the present invention relates to a method of Internet radio broadcasting including listener requests and dedications which comprises of the following steps after a listener logs onto an Internet radio station. The primary embodiment then displays a search screen on the computer screen of the listener, which allows the listener to search for a particular audio and/or video. The listener then selects by the search screen a selected audio and/or video. The next step involves displaying on the computer screen of the listener a search results screen which displays one or more audio and/or videos which correspond to the audio and/or video search information inputted by the listener. The listener then selects a particular audio and/or video file in the search results screen. Also displayed on the search results screen is a dedication section allowing the listener to input a dedication to be spoken prior to the selected audio and/or video file. The listener inputs his/her dedication into this section. He/she may either type this dedication or upload his/her own voice. Then displayed on tie computer screen is an accepted screen that informs the listener when the selected file is to be broadcasted with the accompanying dedication, if tile dedication was made by the listener.

A further embodiment of the present invention is where the basic embodiment is modified by the audio and/or video file comprising a song.

A further embodiment of the present invention is where the basic embodiment is modified by further broadcasting the dedication by using a text-to-speech engine.

A further embodiment of the present invention is where the just previous embodiment is modified by the audio and/or video file comprising a song.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is a block diagram of the method of Internet radio broadcasting including listener requests and dedications of the present invention;

FIG. 2 is a representation of a search screen that is to be displayed on a listener computer screen that allows for searching for a particular audio and/or video file;

DETAILED DESCRIPTION OF THE INVENTION

The invention is an Internet technology and Application technology to allow users of the Internet not only to search for musical artists or other audio and/or video files and select audio and/or video files for the Internet site to play back via streaming media, but also to type in dedications and statements from their browsers or other client applications connected to the Internet and have those statements broadcasted over the same stream via a text-to-voice speech engine just prior to playing the user's selected audio and/or video choice.

Figure 3:
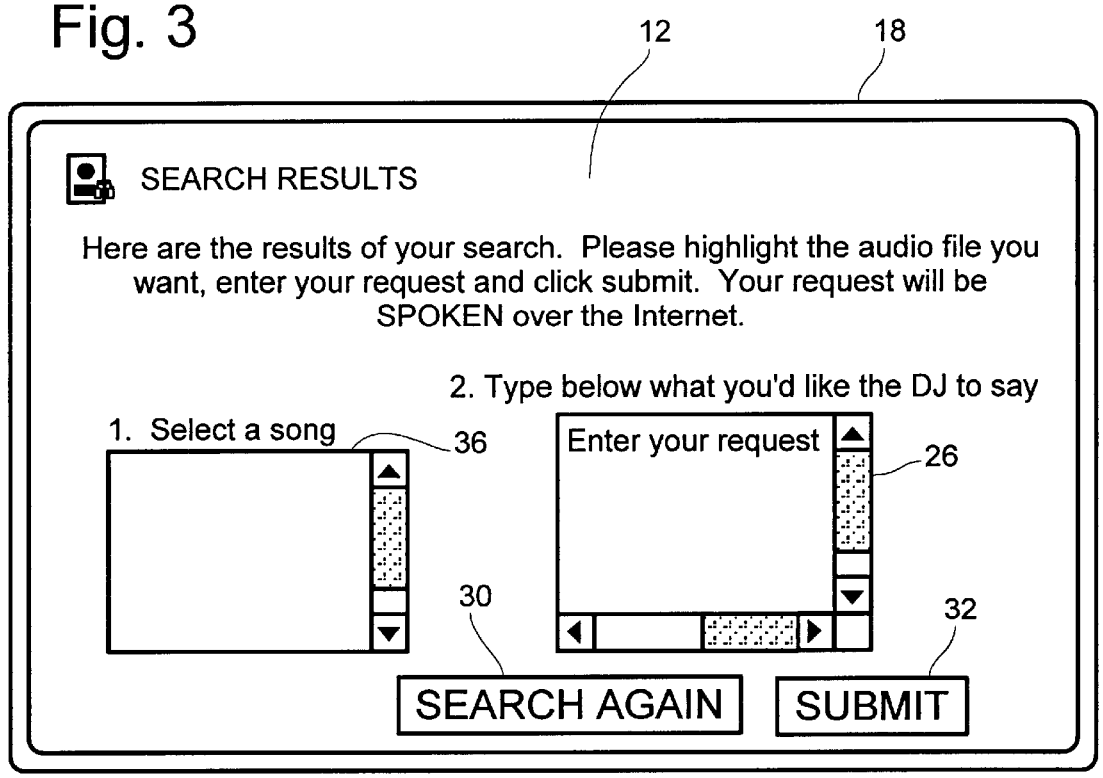
FIG. 3 is a representation of a search results screen which is to be displayed on the listener computer screen aid includes one section for the audio and/or video files available for final selection and another section for the optional input of a dedication.
Figure 4:
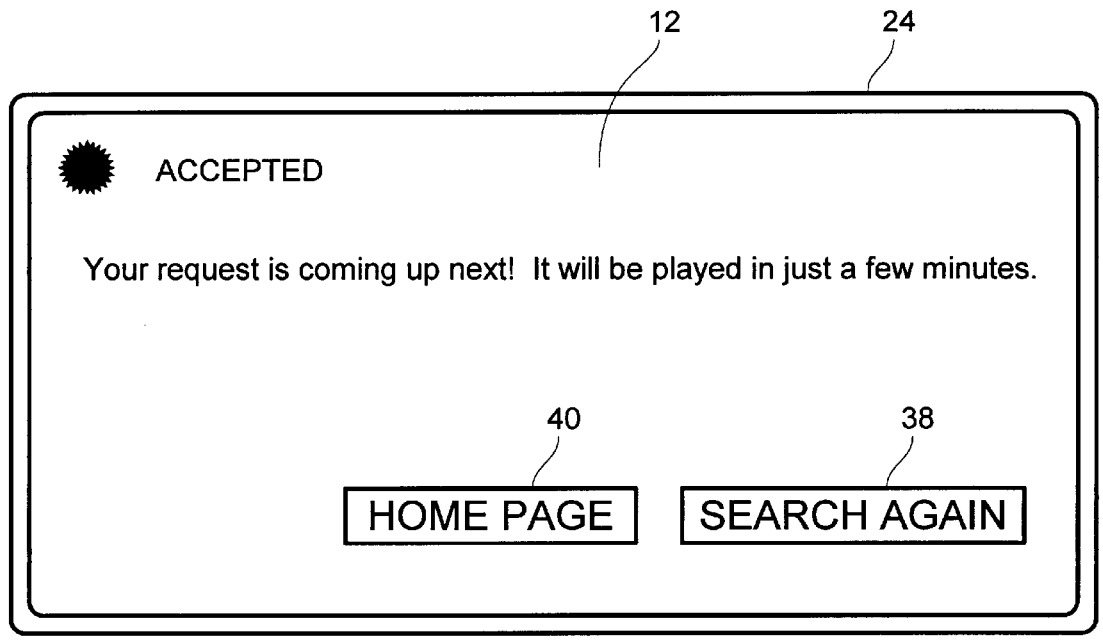
FIG. 4 is a representation of an accepted screen, which is to be displayed on the listener computer screen.

Radio is broadcasted over the Internet as is represented by box 10 in FIG. 1. The radio that is broadcasted by box 10 is broadcasted over the Internet to any computer that wants to log onto the web site for the radio Internet broadcast 10. The radio Internet broadcast 10 may be restricted to a particular regional geographical area or it may be countrywide or it may even be worldwide. A listener computer, which has a computer screen 12, can be logged onto the radio Internet broadcast 10. The listener computer can then make an initial request 14 by means of a search screen 16, which is shown in FIG. 2. Once an initial request has been input, this initial request is communicated back to the radio Internet broadcast 10. The listener will then have displayed a search results screen 18 also by means of the computer screen 12. This search results screen 18 is shown in FIG. 3. The final selection 15 is made by means of the search results screen 18. The search results screen 18 also has the option of creating a dedication 20. This dedication 20 is transmitted from the listener computer screen 12 to a text-to-speech engine 22 or upload of the user's voice file. The text-to-speech engine 22 or uploaded voice file is then coordinated with the radio broadcast 10 so upon playing of the final selection 15, the dedication 20 which has also been received by the radio Internet broadcast 10 will be played just prior to the final selection 15. This is done by taking the text that was input by the listener and reproducing it into computer generated spoken words by the text-to-speech engine 22, uploaded voice file, or spoken words by a live disc jockey. After the final selection 15 and the dedication 20 has been received by the radio Internet broadcast 10 and the text-to-speech engine 22, respectively, an accepted screen 24, FIG. 4, is shown on the listener computer screen 12. The associated dedication can then be emailed, for example, to the person it was dedicated to.

The radio Internet broadcast 10 has a library of audio and/or video files. Generally, these audio and/or video files will comprise of songs. However, other types of audio and/or video files could comprise comedic routines, dissertations, and so forth. The radio Internet broadcast 10 is programmed to play certain audio and/or video files in sequence. If there has not been an initial request 14, then that particular sequence will be followed. However, once a final selection 15 has been made, the final selection 15 will be given priority, that is, it will be played immediately following the currently playing audio and/or video File. If more than one selection that has been requested, as from multiple listeners, then each one of the final selections 15 will be played with the earliest accepted selection being played first (first in, first out basis).

Requests are audio and/or video files that are requested, such as songs. Dedications are the typed in or uploaded voice files that accompany requests. The dedication 20 is to be made by the listener typing on the listener's computer. The typing of the dedication 20 will be displayed in box 26 of the search results screen 18. The search results screen 18 will also display criteria that fit the initial request 14 in box 28 and allow for a final selection 15 to be submitted 32 with or without an accompanying dedication 20. For example, the listener may select a particular audio and/or video file. That audio and/or video file may be produced by ten different artists. The same audio and/or video file with the ten different artists will be displayed in box 28. The listener then has the option of selecting a specific artist and to highlight that section, and then by clicking the submit icon 32 the final selection 15 is transmitted to the radio Internet broadcast 10. After the dedication 20 has been typed in box 26, the listener is to click the submit icon 32 which will then cause the typed words of the dedication 20 to be transmitted to the text-to-speech engine 22. The text-to-speech engine 22, uploaded voice file, or spoken words by a live disc jockey will then be broadcasted with the final selection 15 which has been transmitted to the radio Internet broadcast 10 so that when the final selection 15 is played, the dedication 20 in speech form, will be transmitted prior to broadcasting of the final selection 15.

The search screen 16 includes an artist selection block 34. The search screen 16 also includes audio and/or video file input block 36. If the listener makes a selection within the artist block 34 and inputs particular audio and/or video search criteria in block 36, then more than likely there will only be a single selection that will be reproduced within the block 28. However, if the listener only inputs a particular audio and/or video search criteria in block 36 and does not make an artist selection, then more than likely there will be multiple selections that will be reproduced in the block 28 from which the listener may select one. The same will also be true if the listener only selects a particular artist from block 34 but does not input any particular audio and/or video search criteria within block 36. The search will be initiated upon the listener pressing the submit 35 icon.

The accepted screen 24 will display information about when your particular selection will be displayed. It will tell you if there are audio and/or video files that are ahead of you and how many of these audio and/or video files are to he played prior to your audio and/or video file being played. The accepted screen 24 also includes a search again icon 38 and a home page icon 40. Pressing of the home page icon 40 will bring the listener back to the first or home page of the web site. Pressing of the search again icon 38 will bring screen 16 tip on the computer screen. When the listener makes a selection, the Internet site that contains the radio Internet broadcast 10 then searches a database, comprising of a programming interface for database access. This programming interface is based on the call-level interface specification from X/open and ISO/IE for database application programming interfacing and uses a structured query language as its database access language.

It is to be understood that most any device with Internet access could be used, whether it's a portable computer, desktop unit, or handheld device. The computer may or may not include a monitor, but of course, all computers do include a display screen. It is within the display screen that there will he displayed the screens 16, 18, and 24.

When the radio Internet broadcast 10 finds a song or other audio and/or video file in the request queue, it checks to see if there is any text dedication announcement or any other type of typed in statement stored with this audio and/or video file. If there is, then the radio Internet broadcast 10 calls on the text-to-speech engine 22, updated voice file, or spoken words by a live disc jockey to verbally reproduce the dedication entered by the listener and then plays the selected audio and/or video file. Of course, the text will be verbally broadcast prior to the playing of the particular audio and/or video file. If there isn't any dedication 20, then just the final selection 15 audio and/or video file will be played. All audio and/or video files are broadcasted by the radio Internet broadcast 10 over the Internet by way of streaming audio and/or video, which means that it is continuous.

What is claimed is:

1. In an Internet radio broadcasting programmed to play certain audio and/or video files in requested sequence, a method for broadcasting including listener requests and dedications comprising the steps of:

a. Logging onto an Internet radio station by a computer by a listener;

b. Displaying on a computer screen of the computer a search screen which allows the listener to input an initial request for an audio and/or video file;

c. Selecting on the search screen by the listener an initial requested audio and/or video file;

d. Displaying on the computer screen of the computer a search results screen which displays one or more audio and/or video files which correspond to the audio and/or video file information requested by the listener;

e. Choosing a finally selected audio and/or video file by the listener and submitting that final selection into the search results screen;

f. Also displaying on the search results screen a dedication section allowing the listener to input optional dedications to be broadcasted with the final selected audio and/or video file;

g. Inputting into the dedication section by the listener a dedication;

h. Displaying on the computer screen an accepted screen which informs the listener when the final selection audio and/or video file is to be broadcasted with the accompanying dedications; and i. Broadcasting via media streaming the audio and/or video file and possible dedication over the Internet; wherein the dedication is transmitted from the computer screen of the listener to a text-to-voice speech engine, or is uploaded from a voice file of the listener, and coordinated with the media streaming to be played just prior to the corresponding selection; and wherein the final selection of the audio and/or video file including possible dedication is played immediately following a currently playing audio and/or video file in a requested sequence, or in accordance with first in, first out basis if more than one final selection is requested.

2. The method as defined in claim 1 wherein the audio and/or video file comprises a song.

\* \* \* \* \*